United States Patent [19]

Barnes

[11] Patent Number: 5,031,750
[45] Date of Patent: Jul. 16, 1991

[54] CONVEYOR BELT CLEANING ARRANGEMENT

[75] Inventor: Edwin A. Barnes, New South Wales, Australia

[73] Assignee: Belle Banne (Aust.) Pty Limited, New South Wales, Australia

[21] Appl. No.: 502,039

[22] Filed: Mar. 30, 1990

[30] Foreign Application Priority Data

Mar. 31, 1989 [AU] Australia ............................. PJ3465

[51] Int. Cl.⁵ ............................................ B65G 45/22
[52] U.S. Cl. ..................................... 198/495; 198/497
[58] Field of Search ............... 198/493, 495, 497, 499; 15/256.51

[56] References Cited

U.S. PATENT DOCUMENTS

| | | | |
|---|---|---|---|
| 1,543,411 | 6/1925 | Wittis | 198/495 |
| 1,793,246 | 2/1931 | Philips | 198/495 |
| 4,087,320 | 5/1978 | Danahy et al. | 198/495 X |
| 4,359,150 | 11/1982 | Bowman et al. | 198/497 |
| 4,422,767 | 12/1983 | Yelton | 198/495 X |
| 4,768,644 | 9/1988 | Cromm | 198/499 |

FOREIGN PATENT DOCUMENTS

| | | | |
|---|---|---|---|
| 449142 | 6/1974 | Australia . | |
| 0051183 | 4/1979 | Japan | 198/495 |
| 0562471 | 10/1977 | U.S.S.R. | 198/495 |
| 0914432 | 3/1982 | U.S.S.R. | 198/495 |
| 1055706 | 11/1983 | U.S.S.R. | 198/495 |
| 1091544 | 11/1967 | United Kingdom | 198/495 |

Primary Examiner—Robert P. Olszewski
Assistant Examiner—James R. Bidwell

[57] ABSTRACT

A cleaning arrangement for a conveyor comprises an elongated beam forming a liquid reservoir and being connectable to a source of liquid. The beam is mountable transversely below a conveyor belt. The beam mounts a scraper device and is provided with a plurality of liquid nozzles along the length thereof. The nozzles are in communication with the liquid reservoir. A deflector extends downwardly from the scraper device and is so formed and provided that liquid from the nozzles passes therethrough and on to an adjacent surface of the conveyor belt at a position adjacent to and immediately before or substantially simultaneously with contact between the conveyor belt and the scraper device.

6 Claims, 4 Drawing Sheets

CONVEYOR BELT CLEANING ARRANGEMENT

This invention relates to a conveyor belt cleaning arrangement and more particularly to a conveyor belt cleaning arrangement for more effectively removing residues attached or adhered to the return of a conveyor belt.

BACKGROUND ART

Up until this time various arrangements have been known for removing residues from conveyors belts, including for example scrapers mounted in such a way as to be held in contact with the moving surface of a conveyor belt, the scrapers being used to remove residues from the belt. Such an arrangement for cleaning conveyor belts is known from Australian patent specification No. 449,142. While such arrangements have met with some amount of commercial success, they have not been as successful as might have been expected, given that there has been limitation to the amount of matter that can be removed from the belt. In particular, the scrapers have not always been effective since they do not always faithfully follow the contours of the belt. Furthermore, such scrapers alone are not always effective for all cleaning requirements. For example, a sticky substance adhered to the belt is generally unable to be removed from the belt by a scraper alone or if it is removed, then it often adheres to the scraper, thus reducing the efficiency of the scraper. Further, it has been found that the build-up of residues and molds on conveyor belts is indicative of the disadvantages of relying on scraping means alone to clean conveyor belts.

It has also been found that many particles of substances adhering to or being built-up on the surface of a conveyor belt, are of a profile sufficiently flat to pass under a scraper without being dislodged from the belt. This problem has been aggravated by the fact that with flat, compressed particles, there may well be no space for a layer of air between the belt and particle, as a consequence of which flat particles are often held tightly on conveyor belts by air pressure or suction.

DISCLOSURE OF THE INVENTION

It is an object of the present invention to overcome or at least minimize the above and other disadvantages.

It is a further object of this invention to provide a straight-forward and efficient arrangement for cleaning conveyor belts.

Other objects of this invention will become apparent from the following description.

According to one aspect of this invention there is provided an arrangement for cleaning a conveyor belt comprising scraper means mounted below an underside of a return run of said belt, such as to come into contact with the underside of said belt; spray means being provided and adapted to apply a spray of liquid across the underside surface of said belt, adjacent to and immediately before, or substantially simultaneous with, contact between said belt and said scraper.

According to a further aspect of this invention, there is provided an arrangement for cleaning a conveyor belt, comprising an elongate beam extending transversely below an underside of a return run of said belt; scraper means being attached or mounted to said beam, such as to come into contact with the underside of said belt; spray means being provided and adapted to apply a spray of liquid across the underside surface of said belt adjacent to and immediately before or substantially simultaneous with, contract between said belt and said scraper means.

According to a further aspect of this invention there is provided an arrangement for cleaning a conveyor belt comprising an elongate beam extending transversely below an underside of a return run of said belt; scraper means being so mounted to said beam, such as to come into contact with the underside of said belt; spray means being provided and including a plurality of nozzles laterally spaced apart below the underside of said belt; relative to the longitudinal axis thereof; means being provided to supply liquid to said nozzles; said spray means being adapted in use to apply a spray of liquid across the underside surface of said belt adjacent to and immediately before or substantially simultaneous with, contact between said belt and said scraper means.

According to a further aspect of this invention there is provided an arrangement for cleaning a conveyor belt, comprising an elongate and substantially hollow beam, mounted so as to extend transversely below a return run of a conveyor belt; said beam extending substantially transverse relative to the longitudinal axis of said belt; scraper means being mounted on said beam so as to be in contact with the underside of said belt; said beam forming a liquid conduit and reservoir; means being provided to connect said beam to a supply of liquid; spray means being mounted to said beam and being in communication with liquid within said reservoir; said spray means being adapted in use to direct a spray of said liquid at the underside of said conveyor belt, at or adjacent, a position immediately before or substantially simultaneous with, the underside of said conveyor belt coming into contact with said scraper means.

According to a further aspect of this invention there is provided a method of cleaning a conveyor belt with means including scraper means mounted below a return run of said belt, substantially transverse to the longitudinal axis and direction of travel of said belt, and further including spray means adapted to apply a spray of liquid to the underside of said belt, said method including supplying liquid to said spray means such that a spray of liquid is applied to the underside of said conveyor belt at a position adjacent to and immediately before, or substantially simultaneous with, contact between said belt and said scraper means.

According to a further aspect of this invention there is provided a method of cleaning a conveyor belt, with means including an elongate beam extending transversely below an underside of said belt and mounting scraper means to be in contact with the underside of said conveyor belt, and further including spray means adapted to apply a spray of liquid to the underside surface of said conveyor belt, said method including supplying liquid to said spray means, such that a spray of said liquid is applied to the underside of said conveyor belt at a position adjacent to and immediately before or substantially simultaneously, with contact between said belt and said scraper means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ACCOMPANYING DRAWINGS

The present invention will now be described by way of example only and with reference to the accompanying drawings which are given by way of illustration only, and thus are not limitative of the present invention, and wherein.

BEST MODE FOR CARRYING OUT THE INVENTION

The present invention provides an arrangement for the cleaning of conveyor belts and in particular for applying a cleaning action to the underside of the return run of a conveyor belt. As referred to hereinbefore, it has been known to apply scraper means to the underside of conveyor belts to attempt to clean same and remove extraneous matter therefrom. However, this has not always been as successful as might have been expected.

The present invention provides for a combination of scraper means and spray means, the spray means being connected to a source of liquid, so that a spray of liquid is applied to the underside of the conveyor belt at a position that is preferably immediately before or substantially simultaneous with the contact between the scraper means and the underside surface of the conveyor belt. It has been found that the application of a spray of liquid to the underside of the conveyor belt, at a position immediately before or substantially simultaneous with the application of the scraper means to the belt, greatly assists in removing extraneous matter from the belt, which matter was not removed up until this time by the application of scraper means alone.

Figure 1:
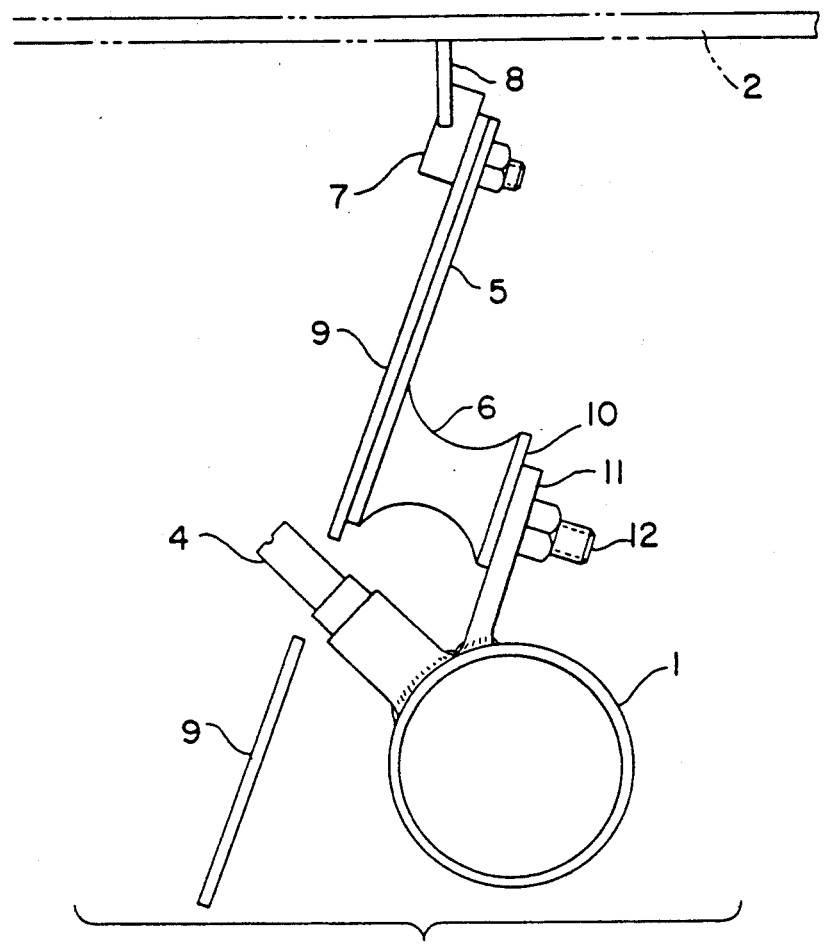
FIG. 1 is a side elevation of a conveyor belt cleaning arrangement according to the present invention.
Figure 2:
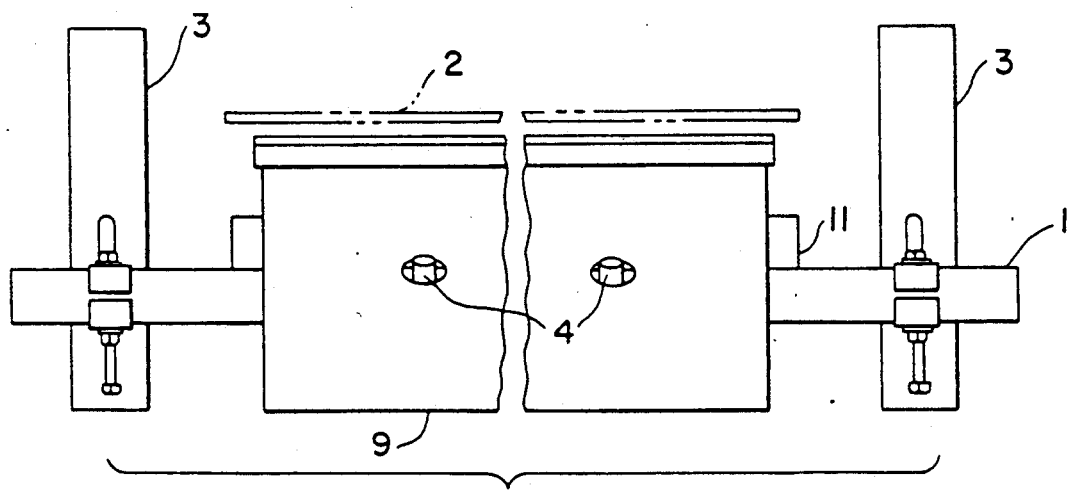
FIG. 2 is a corresponding front elevation.
Figure 3:
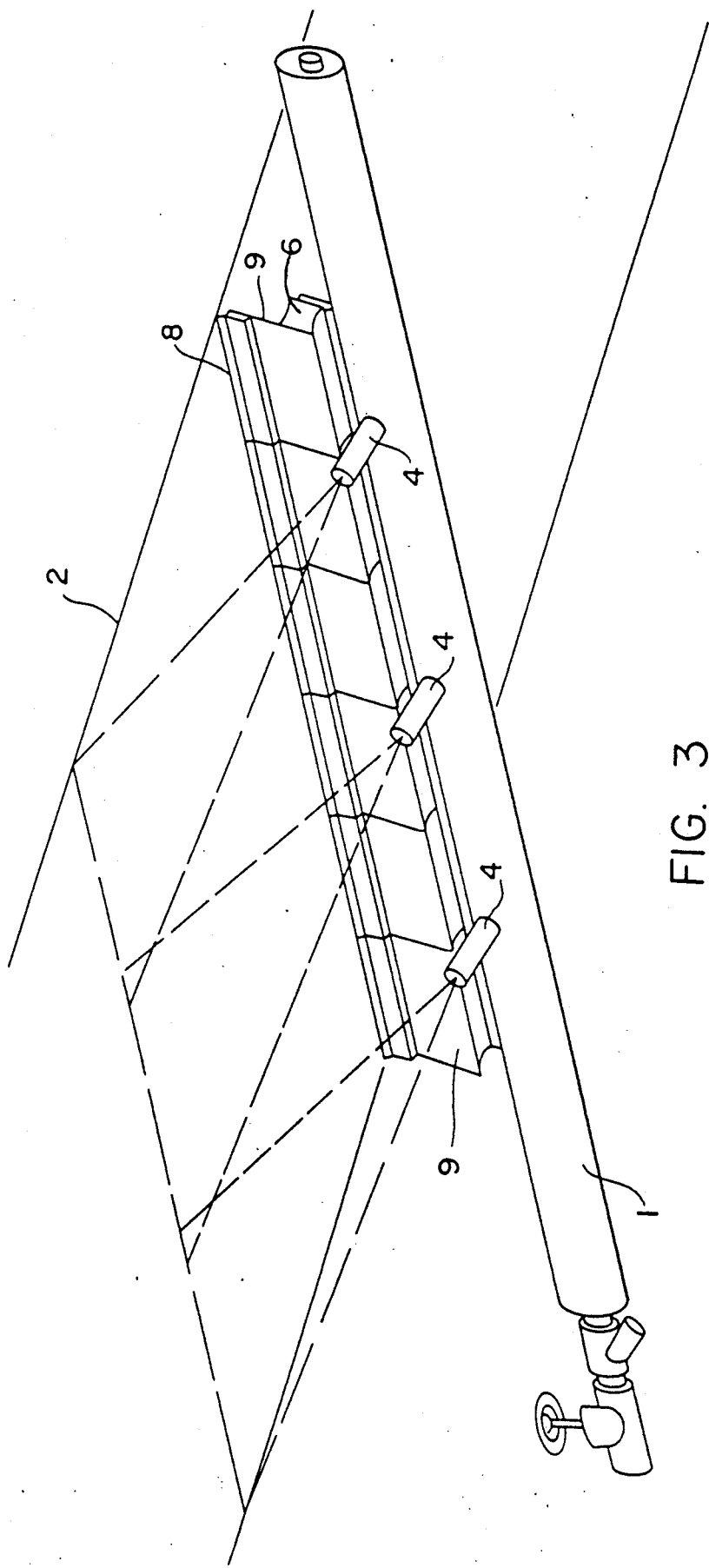
FIG. 3 is an isometric view.

In the preferred form of the invention as shown in the accompanying drawings, it will be seen with particular reference to FIGS. 1 and 2 that an elongated hollow beam 1 is mounted below the underside of the conveyor belt 2 so as to extend transversely below the return of the conveyor belt 2, relative to the longitudinal axis and direction of travel of the belt 2. The beam 1 is preferably supported by support arms or struts 3. Other appropriate mounting or support means can however be used.

In the preferred form of the invention the beam 1 is provided with one or more scraper means, generally indicated at 5, the scraper means 5 being mounted or fixed to the beam 1, for scraping residues adhered to the underside surface of the conveyor belt 2. The scraping means 5 include a resilient member 6 which may be of an elastomeric material, such as for example natural or synthetic rubber, polyurethane, synthetic resin or the lake; a scraper member 7 formed of an appropriate material and having for example a tip 8 of hard material such as tool steel, stainless steel, tungsten carbide, ceramic polyurethane or the like is provided at the upper end thereof. In one preferred form of the invention a deflector plate 9 is mounted to the resilient member 6 and has at its upper end thereof a scraper member 7 affixed thereto by appropriate attachment means. The scraping tips are, in one form of the invention, detachable from the scraper members 7 so that they may be replaced when worn or damaged.

In a preferred form of the invention, a plurality of scraper means 5 are mounted in spaced apart relationship along the length of the beam 1 (and generally transverse to the longitudinal axis and direction of travel of the belt 2) by means of appropriate mounting means, generally indicated at 10, so that the tips 8 are in pressure contact with the underside surface of the return run 2 of a conveyor belt. Thus, on movement of the conveyor belt, the tips 8 follow the undulations and various contours of the belt and apply a scraping action thereto, by virtue of the elastic deformation of the resilient member 6. As is best seen in FIG. 1 of the accompanying drawings, mounting means 10 comprises a mounting plate 11 fastened to the resilient member 6 by a plurality of connection assemblies such as for example nut and bolt assemblies 12 by way of a cladding plate 12A.

The belt 2 of the conveyor of the present invention is formed of any appropriate material and for example extends about a plurality of spaced apart rollers or pulleys 17. Preferably the rollers or pulleys 17 are spaced apart one from the other and one or more thereof is or are connected to a source of power or prime mover, such that on actuation thereof the belt 2 is caused to move and rotate about the rollers or pulleys 17; preferably substantially horizontally. In use the cleaning arrangement of the present invention is provided below the underside of the return run of such a conveyor, such that on actuation and movement of the conveyor it will move over and relative to the cleaning arrangement of the present invention.

In a preferred form of the invention as shown in the accompanying drawings, a plate 9 may extend downwardly past nozzles 4 (to be described hereinafter) and beam 1; the plate 9 is preferably provided with a plurality of apertures such as 9A positioned and dimensioned so as to receive therethrough nozzles 4 associated with the spray means, as will also be described hereinafter. The location of the nozzles 4 through the apertures 9A will not restrict the spray of cleaning liquid onto the belt, but the plate 9 will deflect falling residues and liquid from the belt, thus preventing or minimizing a build-up of debris and associated matter on the beam 1. In one form of the present invention, the portion of the plate 9 below the spray nozzles 4 may be formed as a separate plate, such as to assist in the maintenance and cleaning of the arrangement.

In the preferred from of the invention shown by way of example only in the accompanying drawings, a plurality of scraping means 7 mounted to deflector plates 9 can be mounted to the beam 1 in a substantially side-by-side; spaced apart and juxtaposed relationship, extending transversely across the underside of the conveyor belt. If desired however, a single scraping means 7 can be mounted to the beam 1 and can extend across the underside of the conveyor belt, substantially transverse to the longitudinal axis or direction of travel of the conveyor belt.

In the preferred form of the invention, the beam 1 is substantially hollow and constitutes a reservoir and conduit for cleaning liquid to be applied to the underside of the conveyor belt 2.

Referring further to the accompanying drawings, the beam 1 preferably mounts appropriate spray means, preferably in the form of a plurality of nozzles 4 which are in communication with the interior reservoir 4A of the beam 1. In the preferred form of the present invention a plurality of laterally spaced apart nozzles 4 are provided along the length of the beam 1. The nozzles 4 (or other spray means) are preferably adjustable, so that the angle(s) thereof are adjustable. The nozzles 4 are positioned and attached to the beam 1 so as to be in communication with the reservoir 4A of the beam 1 and so as to be angled upwardly towards the underside of the belt 2. The nozzles 4 preferably extend along the length of the beam 1 so as to extend across the underside of the belt 2 in a direction substantially transverse to the longitudinal axis of the belt, and the direction of travel of the belt 2.

In one preferred form of the invention and as shown in the accompanying drawings, a spray nozzle 4 is provided in association with each scraper means 7 and deflector plate 9, holes 9A being provided in the deflector plates 9 so that the nozzles 4 can pass therethrough.

Figure 4:
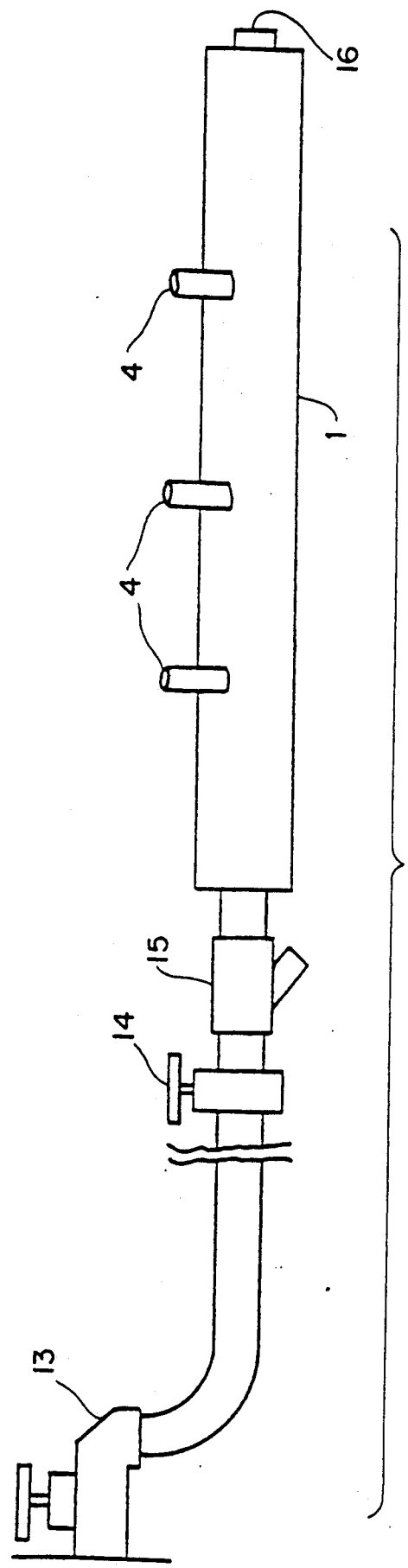
FIG. 4 shows a front elevation of an elongate, hollow beam and associated fittings.

Referring to FIG. 4 of the accompanying drawings, the beam 1 is shown as being connected to a liquid supply means 13A, by means of a supply conduit 13. A flow control valve 14 is provided together with a sieve or strainer 15 and an end cap 16. In the preferred form of the invention the beam 1 is threaded (or formed in some other appropriate manner) at each end sot that it is able to receive liquid from either end according to the layout of a plant. The strainer or sieve 15 is provided to minimize and prevent entry of extraneous matter into the reservoir 4A of the beam 1, from the liquid supply means. As will be appreciated, the entry of such extraneous matter would block and interfere with the spray means and in particular the spray nozzles 4.

In use, and on the flow control valve 14 being turned on, liquid such as for example water or other appropriate cleaning liquid will pass from the supply conduit 13 through the sieve or strainer 15 and into the reservoir 4A. Thereafter the pressure of liquid will cause the liquid to pass through the nozzles 4 to be directed at the underside of the conveyor belt 2.

The cleaning arrangement of the present arrangement is preferably located below the underside of the return run of a conveyor belt adjacent to but spaced apart from a position where the belt 2 leaves an end roller or pulley 17. This is shown by way of example only in FIG. 5 of the drawings.

In use it has been found that in one form of the invention the spray means in the form of nozzles 4 should be angled relative to the underside of the conveyor belt 2, such that the spray of liquid is applied to the underside of the belt 2 at a position adjacent, immediately before or substantially simultaneous with the application of the cleaning tip 8 to the underside of the belt 2. It has been found that in this way, the combination of the cleaning liquid and scraper means maximises the benefit of the invention.

Figure 5:
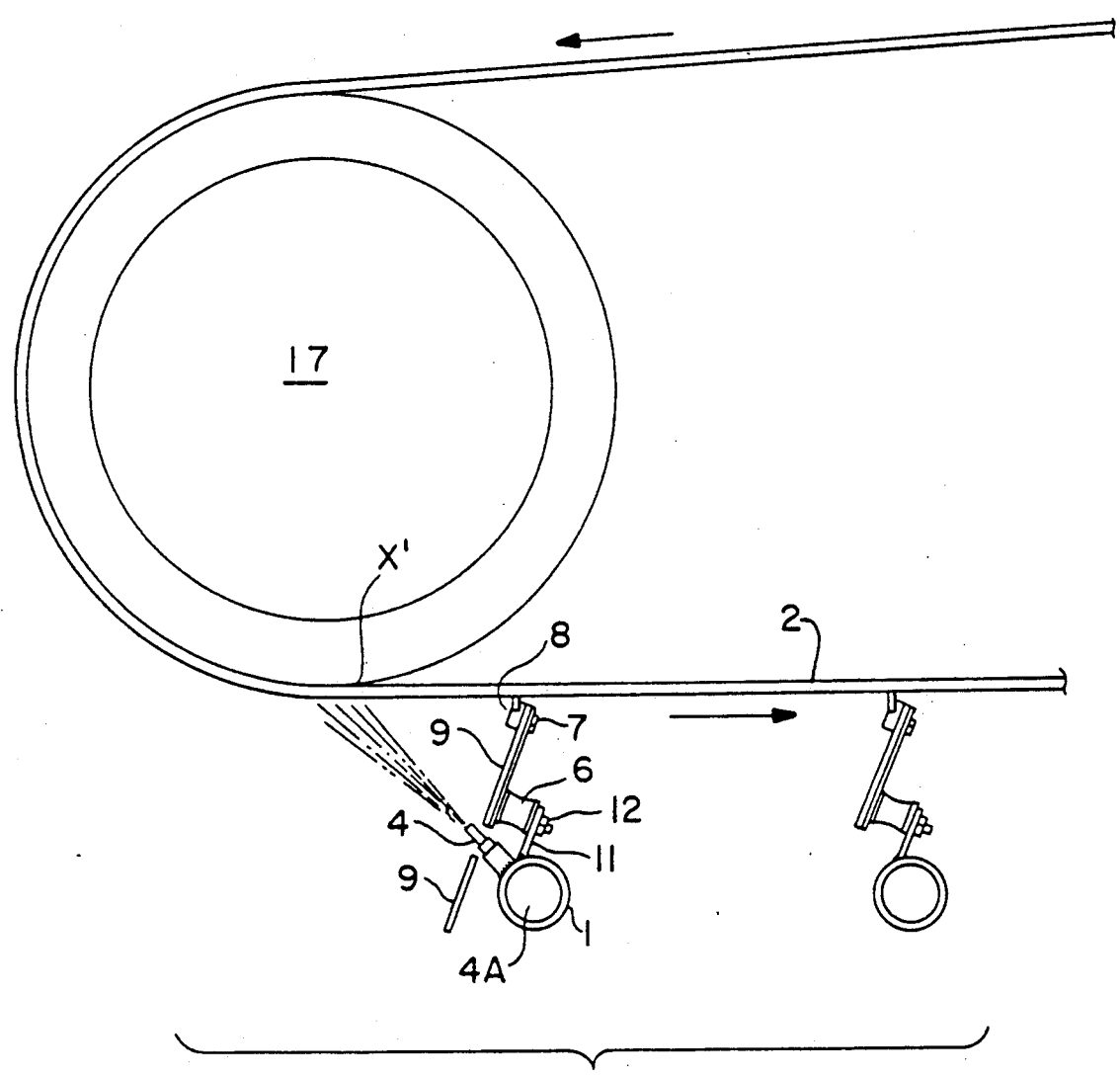
FIG. 5 is a fragmentary side elevation of a conveyor belt; an end-roller; and an inventive cleaning device.

In one form of the invention it has been found desirable to apply the spray of cleaning liquid at a position up to 200 mm after the belt 2 leaves the roller 17 and before the belt comes into contract with the scraper means of the present invention. Referring by way of example only to FIG. 5 of the accompanying drawings, it is in one form of the invention desirable to apply the spray of liquid at a position within 200 mm of the tangential position "X", where the belt 2 leaves the roller 17.

In one form of the invention it is particularly advantageous to have the spray means, preferably in the form of the nozzles 4 angled at an angle approximately 45° relative to the longitudinal axis of the underside of the belt, the spray from such angled nozzles also being at an angle of substantially 45°, this resulting in a substantially "chisel" effect against the underside surface of the belt 2, which removes a substantial amount of residue from the underside of the belt, leaving a relatively small amount of fines in water suspension to be removed by the scraper means of the present invention.

In a preferred form of the present invention it is desirable to have the width of the belt covered by a spray of the cleaning liquid and to this end where a plurality of spray nozzles 4 are provided along the length of the beam 1, the nozzles are so formed and provided, that the spray from each nozzle overlaps one with the other, such as to provide a complete coverage across the width of the belt. In one form of the invention, and by way of example only, there may be a 50 mm overlap of spray from each nozzle 4.

While the spray means is described by way of example only, in the form of nozzles, it should be appreciated that other appropriate forms of spray means can be used.

It should be appreciated that the present invention provides a substantial advance over the conveyor belt cleaning arrangements known and used up until this time. The combination of the spraying of a cleaning liquid and the scraping of the belt, adjacent one with the other, provides for substantial advantages as has been described hereinbefore. There is a substantial advantage of providing the spraying means in association with the transverse beam 1 which supports the scraper means so that there is a substantially unitary arrangement which can be located below the underside of the conveyor belt and which can be assembled, disassembled and repaired in a straight-forward and efficient manner. The provision of the spraying means in association with the beam 1 supporting the scraper means, also allows for accurate angles of spray to be accomplished relative to the underside of the belt 2 and the scraper means.

It should be appreciated however, that in its broadest aspect, the invention provides for the utilisation of a spraying means in association with scraper means. Thus, in further forms of the invention spray means may be provided separately from the scraper means and may be provided with their own supply of cleaning liquid which may apply a spray of cleaning liquid across the underside of a conveyor belt 2 adjacent to and preferably immediately before or substantially simultaneously with the application of the scraper means to the underside of a conveyor belt 2, but independently and separately of, the beam and scraper means. Such spray means can be mounted in any appropriate manner below the underside of the conveyor belt, adjacent to appropriate scraping means so as to achieve the objects of the present invention.

The liquid of the present invention can be any appropriate cleaning liquid such as for example water, water combined with one or more additives, a cleaning liquid, detergent or the like.

INDUSTRIAL APPLICABILITY

The present invention recognizes that while scraping means have been relatively effective in removing matter from the undersides of conveyor belts, they have not, of themselves, been appropriate for removing all matters. The present invention provides a cleaning arrangement which has the capacity to minimize these problems by substantially increasing the amount of matter that is capable of being removed from the underside of conveyor belts, essentially by combining the use of a spray of cleaning liquid with the use of scraper means.

The spray of cleaning liquid preferably acts as a liquid chisel to remove bulk residue, and to assist in removing sticky materials and substances which have previously been located in grooves and cracks in the belt and over which a scraper means per se would pass.

The provision of the liquid spray means substantially increases the efficiency of the cleaning arrangement of the present invention. Minute and flat particles which have previously been left on the conveyor belts, are now able to be effectively removed by the cleaning arrangement of the present invention. The use of the liquid spray also acts as a lubricant, increasing the life of the scraper tips of the present invention and reducing the wear on the conveyor belt. The lubricating action of the liquid spray also reduces friction and minimizes heat build-up. Further, the cleaning liquid is continuously washing away residues collected by the scraper so as to ensure that the cleaning arrangement does not become clogged. The deflector plates of the present invention assist in that regard.

In the preferred form of the invention, the beam 1 which acts as a mounting beam for the scraper also forms a reservoir for the cleaning liquid, cleaning nozzles preferably being mounted to the beam so that the spraying means and scraper means are formed in a substantially unitary construction which allows for effective mounting, utilisation, replacement and repair.

It should be appreciated that the present invention provides substantial advantages over arrangements used up until this time. Further, modifications and improvements may be made to this invention without departing from the scope thereof as defined by the appended claims.

I claim:

1. An arrangement for cleaning a conveyor belt comprising:

an elongated beam mountable transversely below an underside of a return run of said conveyor belt;

a liquid reservoir formed in said beam, the liquid reservoir being connectable to a supply of liquid;

A plurality of spray nozzles laterally spaced apart along the length of the beam, the spray nozzles being in communication with the liquid reservoir;

scraper means operatively attached to said beam for contacting the underside of the belt; and deflector means extending downwardly from said scraper means, said deflector means being formed sot that spray issuing from the spray nozzles can pass therethrough and onto the underside of said belt adjacent to and immediately before, or substantially simultaneously with, contact between said belt and said scraper means.

2. The arrangement as claimed in claim 1, wherein a plurality of scraper means are mounted to and extend along the length of said beam, at least one spray nozzle being provided adjacent each scraper means.

3. The arrangement as claimed in claim 1, wherein an angle of said nozzles is adjustable.

4. The arrangement as claimed in claim 1, wherein each nozzle is so angled relative to the underside of said conveyor belt that spray therefrom is at an angle of 45° relative to a longitudinal axis and direction of travel of said belt, the spray thereby applying a chisel-like action to extraneous matter on the underside of said belt.

5. The arrangement as claimed in claim 1, wherein the nozzles are positioned and angled so that spray therefrom overlaps to thereby provide a spray of liquid across the width of the underside of said belt.

6. The arrangement as claimed in claim 1, wherein the spray means applies a spray of liquid to the underside of said conveyor belt at a position up to 200 mm from a tangential point at which said belt leaves a roller, said position being one of adjacent, immediately before and substantially simultaneously with the underside of said conveyor belt coming into contact with said scraper means.

* * * * *